United States Patent [19]

Lefrou et al.

[11] Patent Number: 5,694,144
[45] Date of Patent: Dec. 2, 1997

[54] ELECTROCHROMIC SYSTEM AND ITS SUPPLY PROCESS

[75] Inventors: Christine Lefrou, Ivry Sur Seine; Marc Ast, Fontenay Aux Roses, both of France

[73] Assignee: Saint-Gobain Vitrage, Courbevoie, France

[21] Appl. No.: 441,295

[22] Filed: May 15, 1995

[30] Foreign Application Priority Data

May 16, 1994 [FR] France .................. 94 05948

[51] Int. Cl.$^6$ .................................................. G09G 3/19
[52] U.S. Cl. ...................... 345/49; 345/105; 359/275
[58] Field of Search .................. 345/49, 105; 359/265, 359/267, 275, 273, 269, 270, 271

[56] References Cited

U.S. PATENT DOCUMENTS

| | | |
|---|---|---|
| 4,201,984 | 5/1980 | Inami et al. . |
| 4,535,329 | 8/1985 | Koyanagi et al. . |
| 5,124,833 | 6/1992 | Barton et al. . |
| 5,231,531 | 7/1993 | Defendini et al. . |
| 5,365,365 | 11/1994 | Ripoche et al. . |
| 5,402,144 | 3/1995 | Ripoche . |

FOREIGN PATENT DOCUMENTS

| | | |
|---|---|---|
| 0 078 463 | 5/1983 | European Pat. Off. . |
| 2 074 747 | 11/1981 | United Kingdom . |

*Primary Examiner*—Regina D. Liang
*Attorney, Agent, or Firm*—Oblon, Spivak, McClelland, Maier & Neustadt, P.C.

[57] ABSTRACT

Electrochromic systems having a material, whose coloration state and/or the transmission in certain electromagnetic radiation wavelengths varies by performing an electrochemical reaction involving the passage of an electric current. The electric current is generated by an intensity generator able to supply a current, whose intensity obeys a reference value determined as a function of the number of charges to be transferred for switching from the initial coloration state to the desired coloration state and as a function of the time chosen for the switching. The system also relates to using a power supply in an electrochromic glazing process.

17 Claims, 4 Drawing Sheets

ELECTROCHROMIC SYSTEM AND ITS SUPPLY PROCESS

BACKGROUND OF THE INVENTION

1. Field of the Invention

The present invention relates to an electrochromic system of the electrochromic glazing type, as well as to its supply process.

2. Description of the Background

Electrochromic glazings are glazings having an electrically controlled energy and/or light transmission, or in other words glazings whereof it is possible to modify the transmission of certain wavelengths of the electromagnetic radiation, particularly in the infrared and/or in the visible range under the effect of an electric current.

Such glazings are of particular interest for equipping the facades of buildings or vehicles in order to control the solar input to the interior of the rooms or passenger compartments. It is also possible to use the same for forming internal partitions in buildings or to combine them with mirrors of the rear-view type to prevent glare phenomena.

The electrochromic systems according to the invention are all systems based on an electrochemical reaction involving the passage of an electric current, which must be supplied to the system for at least one of the directions of the reaction or more frequently in both switching directions.

The best known of these systems are based on the reversible insertion of cations into metal oxides. Hereinafter and for reasons of clarity, reference will essentially be made to such systems for dealing with the difficulties involved, but the invention must not be considered as limited to such electrochromic systems.

Their operating principle is as follows. They have a layer of a material with electrochromic properties able to reversibly insert cations, particularly H—protons or cations of an alkali metal such as lithium Li—and therefore pass from one degree of oxidation to another, each of the degrees of oxidation corresponding to a different colouration state.

Thus, tungsten trioxide, which is virtually colourless in its oxidized state (a) has a dark blue colouration in its reduced state (b) obtained by inserting cations M+ in accordance with the following reaction:

$WO_3(a) + xM^+ + xe \rightleftharpoons M_xWO_3(b)$ on $M^1 = Li^+, H^+$.

The insertion reaction assumes one cation source and one electron source. Moreover in a complete system, the obtaining of a good reversibility, at least for a large number of insertion/deinsertion cycles, is dependent on the presence of a counterelectrode, which is able to insert and deinsert cations in a reversible and complementary manner with respect to the main electrode.

This is the reason why electrochromic glazings are usually constituted by two substrates, normally of glass, between which are placed two electroconductive, transparent layers equipped with current leads, said layers being successively separated by an electrode constituted by a cathodic electrochromic material such as $WO_3$, an electrolyte able to ensure a transfer of cations and finally a counterelectrode inserting or deinserting the cations symmetrically with respect to the electrode. Preferably, the counterelectrode is also made from electrochromic material, an anodic electrochromic material such as iridium oxide or nickel oxide being associated with a cathodic electrochromic material such as $WO_3$. Such an anodic electrochromic material is colourless in the reduced state (or inserted state) and coloured in the oxidized state (or deinserted state). Therefore, it also makes it possible to reinforce the colouration contrast of the glazing.

An ideal operation of an electrochromic glazing would consist of permitting the user, by an electrical control, to pass the glazing in a random manner from one degree of colouration to another within a given light transmission range and this in a switching time, i.e. a colouration modification time, which is fast under any random glazing use conditions and with any glazing size. However, this aim is difficult to achieve, in that many parameters and constraints are involved linked with the structure and the materials from which the glazing is made, leading to all the efforts being made at present in order to optimize power supplies.

Thus, in order to make the system operate, it is necessary to impose, between any pair of two points which face one another on either side of the electrolyte, a potential difference which is at least equal to the difference of the thermodynamic potentials of the desired insertion/deinsertion reaction. In practice, bearing in mind the interface and resistance problems of the electrolyte, the minimum value to be imposed is still higher than the difference of the thermodynamic potentials. The higher the potential difference applied the faster will be the colouration or decolouration. Nevertheless, the operating voltage must not be too high, because it is necessary not to exceed voltages permitting parasitic reactions which could e.g. lead to the appearance of bubbles. For each colouration state change of the electrochromic system, it is consequently necessary not to exceed a particular potential difference, referred to hereinafter as the limit potential of the system.

In addition, the electroconductive layers of the system are intended for the transfer of charges and the voltage can only be applied between two diametrically opposite terminals of the electrochromic system. However, it is obvious that the electroconductive layers necessarily have a certain resistance. Thus, in the case of a transparent layer based on tin-doped indium oxide (ITO), a square resistance of approximately 5 Ohms now corresponds to an optimum conductivity under industrial production conditions, which lead to ohmic drops of the system which increase with it dimensions. Therefore, the potential difference effectively imposed between two facing points is smaller as the points are moved away from the terminals and for the latter there is a very significant delay in colouration, the maximum colouration only being obtained after several minutes. When the system becomes large (e.g. approximately 1 $m^2$) ,the complete switching of the system can be impossible to achieve in a reasonable time.

An improvement is provided by EP-A-408,427 which, with the aid of a three electrode connection of the potentiostat type, makes it possible to very significantly increase the switching speeds by modifying the potential difference applied, so that the potential difference between a given point of the electrochromic material layer in the immediate vicinity of the current lead strip and its facing point of the counterelectrode, remains during this switching period equal to a reference or nominal voltage above which parasitic reactions are liable to occur. This supply process consists of applying to the terminals of the system and at the start of the switching cycle a voltage which is significantly higher, taking account of the ohmic drop, which permits a reduction of the switching times.

It should be noted that the reference voltage is dependent on the temperature of use of the glazing. Thus, at high temperature, the conductivity of the electrolyte is relatively high, so that the ohmic drops are relatively low and the reference voltage only has to take account of the parasitic electrochemical reactions. For lower temperatures close to ambient temperature, it is necessary to slightly increase the reference voltage value as a function of the increase in the ohmic drops. Finally, for even lower temperatures of typically 0° C. or less, this type of supply is not suitable, because the ohmic drop voltage decreases strongly during a colouration and a high reference voltage, chosen for reasonable switching times, will have a degrading effect at the end of colouration. This leads to relatively complex supply devices.

Moreover, the switching times still remain linked with the size of the glazings, which can cause aesthetic problems if it is wished to assemble electrochromic glazings of different sizes in a single partition or facade. This supply system also tends to accentuate "edge" effects. In the colouration or decolouration phase, the modification of the colouration is faster at the periphery of the glazing than in its central part.

SUMMARY OF THE INVENTION

The aim of the invention is to obviate these disadvantages by proposing a novel power supply type for electrochromic glazings permitting a greater freedom in the choice of the switching times, particularly by freeing them to a significant extent from the use temperature variations and the glazing size variations.

The invention has for its main object an electrochromic system having a material, whose colouration and/or transmission state in certain wavelengths of the electromagnetic radiation varies reversibly by using an electrochromic reaction involving the passage of an electric current, characterized in that said electric current is generated by an intensity generator able to supply a current, whose intensity obeys a reference value determined as a function of the number of charges to be transferred for switching from the initial state to the desired state and as a function of the time chosen for the switching.

The invention more particularly applies to an electrochromic system having two transparent substrate, e.g. of the glass sheet type, coated with two transparent electroconductive layers successively separated by an electrode formed by a layer of an electrochromic material, an electrolyte and a counter electrode, the electroconductive layers being connected to an electric control circuit incorporating an intensity generator able to supply intensities determined as a function of the number of charges to be transferred to obtain the desired colouration change and as a function of the desired colouration change time.

Thus, by replacing the conventional voltage generators by an intensity generator, it is possible to largely solve the problems due to the behavioral changes of the glazing materials as a function of the size or temperature, particularly with regards to ohmic losses and their variations due to ionic conductivity variations of the electrolyte with the temperature. Thus, the colouration or decolouration of the system is obtained by the transfer of a given number of ions, the transfer of an equivalent number of electrons transferred from one electrode to the other corresponding to an electric current. Therefore, the transfer time, which corresponds to the colouration change time, more simply called the switching time, is linked with the current application time. Thus, it is possible to determine the adequate number Q of electric charges by a simple calculation taking account of the size of the glazing, the precise nature of the layers of electrochromic materials used and the contrast which it is desired to obtain (the contrast is defined as the ratio of the light transmission in the decoloured state to the light transmission in the coloured state). No matter what the age or production fluctuations of the glazing (in particular thickness variations of the electrochromic layers) or the temperature, the variation law of the quantity of charges per surface unit is unchanged. After deciding on a switching time (chosen freely, but remaining within the limits of the possible, i.e. ensuring that it corresponds in all possible use configurations of the system to admissible voltage levels), it is possible to calculate the intensity I which it is necessary to apply by the simple formula $I=Q/t$. Thus, it is solely the intensity which is calculated, controlled and imposed and no longer the voltage, which is liable to fluctuation during switching operations as a function of size, the temperature of the glazing, the evolution of the glazing during time or from one glazing to another in accordance with production fluctuations. As a very rough approximation, it is possible according to Ohm's law $U=RI$, to see that it is this I.A factor R which can be modified as a function of the conditions of use and therefore the voltage, even if the intensity I is kept constant or with a given variation profile during switching.

The invention offers very significant advantages. It firstly makes it possible to choose the switching time no matter what the size of the glazing, account being taken of the adequate calculation of the intensity to be imposed. On assembling several electrochromic glazings of different sizes, e.g. for equipping a building facade, the switching times can be uniform over the entire facade and no longer do the switching times rise with the size of the glazing. Moreover, the invention obviates problems of switching time modifications linked with the use temperature. It has also been found that the electrochromic glazing can have with such a power supply system a better resistance to high temperature cycling. By obviating the ohmic loss problems, it has also been found that the colourations and decolourations of the glazing take place in a particularly homogenous manner, with a virtually complete disappearance of the edge effect. The modification of the colouration takes place at the same time over the entire surface of the glazing without "starting" at the periphery, which can be linked with the fact that, compared with a supply by a voltage generator, in the case of a supply according to the invention, the maximum intensity passing into the circuit for the same glazing size and contrast, generally has much lower values in absolute terms.

Preferably, the intensities supplied by the intensity generator are regulated, at least when the colouration change is a decolouration, in order to remain at values lower in absolute terms than the values corresponding to a voltage in the circuit liable to bring about a deterioration of the system. Thus, by only controlling the intensity, under certain use conditions of the system, the voltage can increase sufficiently in the circuit to "leave" the electrochemical stability zone of the system, which can then give rise to the formation of parasitic reactions irreversibly deteriorating the system, particularly in the decolouration phase. It is therefore prudent to take account of this risk for maintaining the voltage in the stability zone, by adapted intensity values and voltage measuring means. In order to perform all these calculations and measurements in order to determine and regulate the intensities supplied, it is possible to make use of any data processing and/or electronic means. Preferably this regulation is provided both in decolouration and in colouration.

Thus, bearing in mind that the value of the deterioration voltage can vary significantly as a function of the system use conditions, it is more appropriate to base the regulation not on the measured value of the voltage, but on variations thereof and more precisely on sudden variations thereof (i.e.

on the first derivative of the curve U=[(t)]). However, such a regulation must take account of the chosen intensity. This is not the case when use is made of a regulation based no longer on the first derivative, but preferably on the second derivative of the curve U=[(t)], which amounts to detecting sudden variations in the voltage corresponding to the use of new electrochemical equilibria, or in other words the appearance of parasitic reactions. Therefore, it is particularly advantageous to base the regulation of the system on the second derivative of the curve giving the voltage as a function of time.

Thus, for regulating the intensity, it is e.g. possible to measure the voltage of the circuit with the aid of an appropriate means and then, particularly with a given time interval, determine its second derivative relative to time. As soon as this second derivative reaches a given nominal value, the generator is made to reduce the intensity which it supplies. It has been found that it is both simple and effective to refer less to the actual voltage values than to their sudden variation change for detecting the danger and adapt the power supply of the generator as a consequence thereof. This also makes it possible to obtain freedom from temperature variation problems. However, it is also possible to choose any other criterion for carrying out the regulation.

Another regulation system consists of measuring the voltage or calculating its first derivative relative to time on the basis of this measurement. Means are then provided for imposing a reduction in the intensity supplied by the generator when the voltage, respectively its first derivative, reaches a nominal value determined on the basis of measurements of the voltage, respectively calculations of its derivative, performed as from the start of the colouration change of the system. This amounts to not determining in fixed manner from the outset nominal values of the voltage or its derivative, but instead taking account of values obtained during the previously effected intensity reduction in order to "fix" the thresholds not to be exceeded (these values being stored by ad hoc data processing/electronic means). This gives a regulation precisely adapted to the evolution of the electrochromic system when it changes colouration and to its "response" to the power supply imposed thereon, this taking place in a permanent manner by "successive adjustments" of the nominal values to be respected.

Preferably, the power supply is interrupted when the intensity delivered has reached a minimum given value, when the efficiency has reached 100% (the efficiency is the ratio of the number of charges transferred during switching, e.g. decolouration, to the number of charges transferred during the reverse preceding switching, in the present example, consequently the colouration), or when the colouration state of the system has reached a given value (it can be in light transmission $T_L$ measured by an appropriate $T_L$ sensor). The power supply is then interrupted as soon as one or other of these conditions is fulfilled.

The electrical connection of the electroconductive layers of the electrochromic system to the electric control circuit advantageously takes place at two current supply points, each of which is located on one of the two layers (particularly by welding spots). Each of these points supplies a conductive network in contact with the electroconductive layer on which it is located. This network can be in numerous different forms, namely peripheral supply strips, or a real network, particularly based on conductive enamel deposited by screen process printing.

It should also be noted that such an electrochromic system can carry out the electrical connection of its two electroconductive layers to the electric control circuit solely by conductive supply strips deposited on one edge of each of the layers in such a way as to be diametrically opposite. Thus, there is a simplification of the connection procedure compared with that recommended in EP-A-408,427 which uses three supplies, the latter serving as a reference. Moreover, to the same extent, the risks in the case of breaking or tearing out of one of the supplies are reduced.

The invention also relates to a process for the electric supply of an electrochromic system, whose switching between two states of the system, in particular two colouration states, is obtained by the passage of an electric current. This power supply takes place by generating a current intensity which is a function of the number of charges to be transferred in order to obtain the desired colouration change and as a function of the desired colouration change time.

This process is applicable to electrochromic systems operating by the insertion/deinsertion of cations and in particular those referred to hereinbefore, but also to other known electrochromic systems, such as so-called viologenic systems, systems having electroactive compounds distributed in a matrix placed between two electrodes, the application of an electric current making it possible to modify the colouration of said compounds, or systems operating by reversible electrodeposition.

DESCRIPTION OF THE DRAWINGS

Other advantageous details and features of the invention can be gathered from the following description with reference to the attached drawings, wherein.

DETAILED DESCRIPTION OF THE PREFERRED EMBODIMENTS

Figure 1:
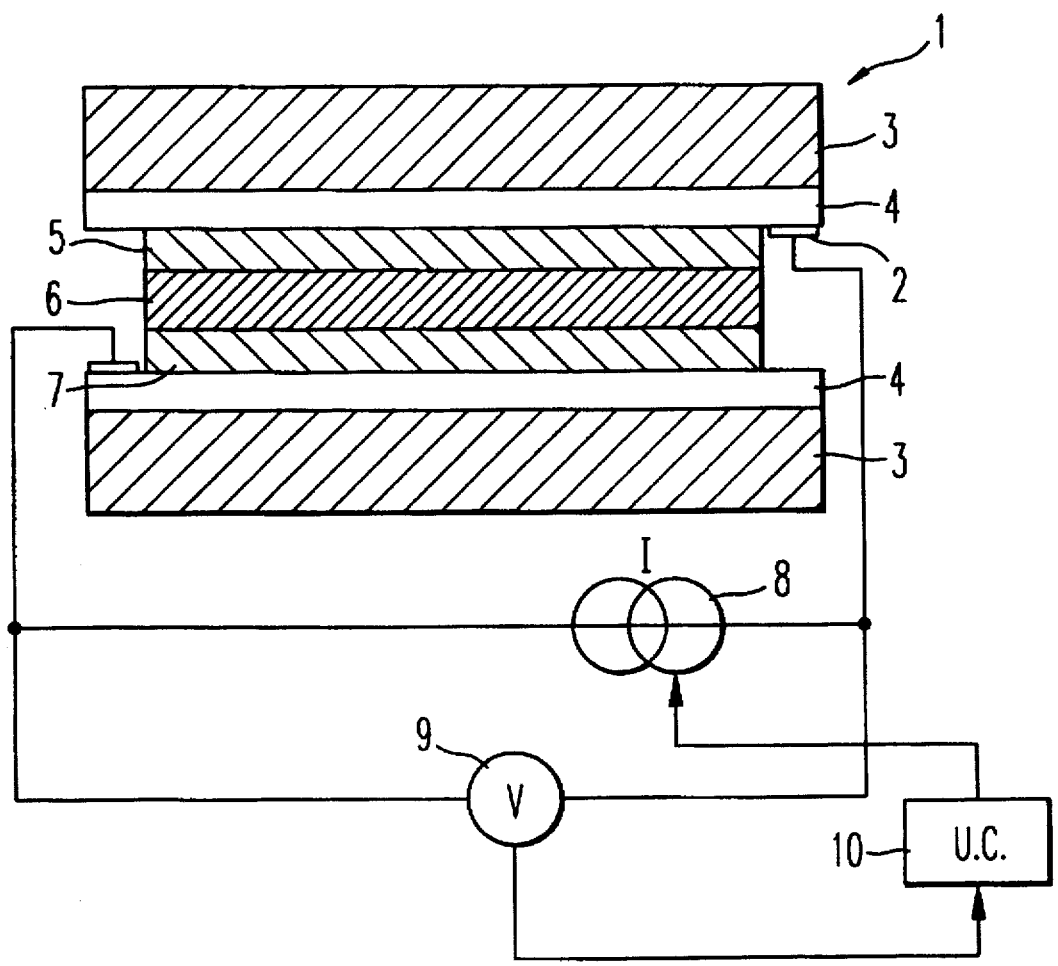
FIG. 1 is a sectional representation of an electrochromic glazing according to the inventions.

FIG. 1 is a cross-section through the electrochromic glazing according to the invention. For reasons of clarity, the thickness relationships of the different layers have not been respected.

The glazing 1 is constituted by two glass substrates 3, two transparent electroconductive layers 4, and electrode of cathodic electrochromic material 5, an electrolyte layer 6 and a counterelectrode 7 of anoid electrochromic material. Two current leads 2 are provided for supplying the conductive layers 4 and are constituted by metal stripe, which are diagonally opposite and parallel to the glazing length. The peripheral seal is not shown.

The electric supply circuit is shown very diagrammatically and comprises an intensity generator 8 and a voltage measuring means 9. The generator 8 is controlled by a control unit 10, whose main function is to determine the adequate intensity whilst taking account of the size of the glazing, the contrast to be obtained and the desired switching time. In the simplest version covered by FIGS. 2 to 5, there is no voltage regulation. In the more elaborate version according to FIG. 6, there is a regulation and the control unit then exploits the information given by the voltage measuring means 9.

The invention is applicable to any electrochromic system operating by insertion/deinsertion reactions with respect to $H^+$ or $Li^+$ cations, particularly or more generally to any electrochromic system involving the passage of an electric current, such as e.g. the so-called viologenic systems. A first series of tests was prepared with a first type of electrochromic glazing operating by proton conduction and using a solid, proton-conducting electrolyte 6. The different materials have the following characteristics:

glass substrate 3:1.5 mm thick float glass sheets of dimensions 30×30 $cm^2$; electroconductive layers 4: tin-doped indium oxide, deposited by magnetron cathodic sputtering, thickness 400 nanometers and square resistance of 8 ohms;

cathodic electrochromic material 5: tungsten oxide $WO_3$ deposited by reactive magnetron cathodic sputtering from a tungsten target in the presence of oxygen under a pressure of 20 millitorrs (i.e. 2.66 Pa) and of thickness of 300 nm; anodic electrochromic material 7: iridium oxide deposited by magnetic field-assisted cathodic sputtering under a pressure of 6 millitorrs (i.e. 0.8 Pa) of an oxygen/hydrogen gaseous mixture in a volume ratio 80:20 and of thickness 55 nanometers;

electrolyte 6: solid solution of anhydrous phosphoric acid in a polyoxyethylene of thickness 80 micrometers, conductivity at 20° C. of 9–$10^{-6}$ $ohm^{-1} \cdot cm^{-1}$ and light transmission above 85° C. and prepared in that, under anhydrous conditions, dissolving per liter of solvent anhydrous phosphoric acid (21.5 g) and poloxyethylene of molecular weight 5 million (density 1.21), glass transition temperature –40° C., O/H ratio of the number of oxygen atoms of the polymer to the number of hydrogen atoms of the acid 0.66, the solvent being a volume mixture of 60:40 acetonitrile and tetrahydrofuran.

The solution is poured under an atmosphere with a controlled moisture content (equal to or below 50 ppm of water) using the pull-film method on the substrate covered with one or other of the electrochromic material layers. The solvent is then evaporated at ambient temperature and under dry air for 20 hours.

A comparison example was made using a glazing 1 bis having a stacking and identical materials as compared with the example according to the invention. The only change is the electric power supply, which is on this occasion according to EP-A408,427 to which reference should be made for further details. The intensity generator 8 is replaced by a voltage generator and the conductive layers are provided with a third current lead called the reference point facing one of the two first leads with a connection of the potentiostat type. In order to switch the glazing, between the two diametrically opposite current leads 2 is applied a voltage $U_1$ with the aid of the voltage generator and the value of the voltage is modified as a function of the so-called reference potential value $U_2$ measured between one of the leads and the third lead facing it and which constitutes the reference lead. The adaption of $U_1$ as a function of $U_2$ normally makes it possible to maintain the system in its electrochemical stability range.

A first series of experiments was carried out with the two glazings. The aim is to cycle them, i.e. to pass them from the decoloured state to the coloured state and then again to the decoloured state, by imposing a contrast C equal to 5 between the decoloured state and the coloured state and at three different temperature 0°, 20° and 80° C.

With the glazing supplied according to the invention in the colouration phase is imposed an intensity of –28 mA and in the decolouration phase an intensity of +28 mA, the intensity having been previously calculated by the control unit in order to obtain an adequate cation transfer for the desired contrast and as a function of the size of the glazing, the desired switching time, on this occasion six minutes, was imposed on the control unit.

With the glazing according to the comparison example the voltage generator imposes in the colouration phase a voltage $U_1$ such that the reference potential $U_2$ is maintained at a value of –1.6 V. In the decolouration phase, $U_1$ is imposed by the generator in order to maintain the reference voltage $U_2$ at a value of +1.0 V.

| Temperature | Response Time (Ex. 1) | Response Time (Ex. 1 bis) |
|---|---|---|
| 0° C. | 6 | 47 |
| 20° C. | 6 | 3 |
| 80° C. | 6 | (1) |

The table shows that the invention makes it possible to considerably reduce the response times of the glazings at low temperatures, the 47 minutes at 0° C. for the comparison example 1 bis being prohibitive, whereas Example 1 according to the invention makes it possible to obtain at the same temperature an acceptable switching time of six minutes.

Moreover, the power supply according to the invention makes it possible to fix a switching time which is independent of the use temperature, which is far removed from the case of example 1 bis, where there is a factor of virtually 50 between the switching time at 0° and at 80° C.

In the latter case, the value of 1 minute was placed in brackets for the colouration time of example 1 bis at 80° C., in order to indicate that following about ten switching operations the glazing had been significantly damaged (lack of reference voltage reduction), which is largely not the case for example 1 according to the invention.

Figure 2:
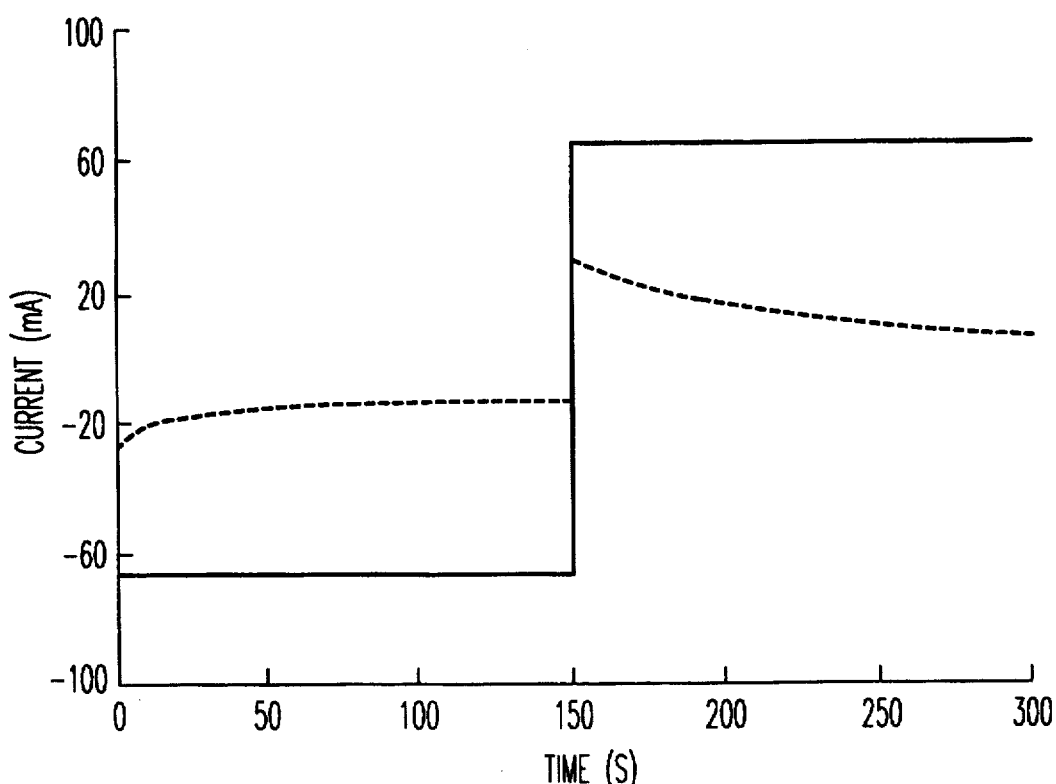
FIGS. 2 and 3 are presentations at 0° C. of the evolution respectively of the intensity and voltage of a glazing supplied by an intensity generator according to the invention and a comparison glazing supplied by a voltage generator during a colouration/decolouration cycle.
Figure 3:
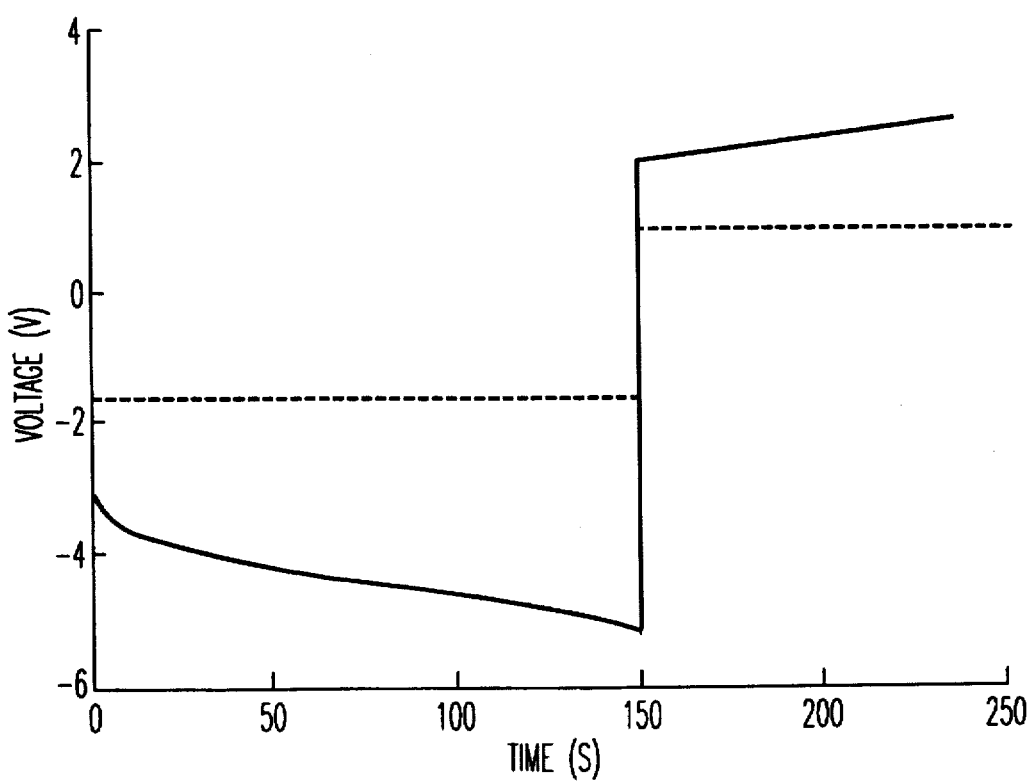

A second series of experiments is illustrated with the aid of FIGS. 2 and 3. on this occasion a switching time of 150 seconds was chosen (which corresponds to the duration of a switching operation, with a potentiostatic connection, at 20° C. for a contrast equal to 5) for the two glazings at 0° C. and with the aim of maintaining a contrast C=5.

The graph of FIG. 2 shows on the abscissa the time in seconds and on the ordinate the intensity in mA. The continuous line curve relates to example 1 and the broken line curve to example 1 bis. The first 150 seconds correspond to the colouration of the glazings and the following 150 seconds to their decolouration.

The graph of FIG. 3 is similar to that of FIG. 2, but on this occasion the ordinate correspond to the voltage in volts and not the intensity. For example 1 bis, it is the voltage $U_1$, generated by the generator taking account of the reference voltage $U_2$.

The glazing according to example 1 has no difficulty in achieving a contrast of 5. However, the glazing according to example 1 bis is unable to acquire a contrast exceeding 1.5, which is clearly apparent in FIG. 2, where the intensity curve of example 1 bis indicates much lower values in absolute terms than the intensity curve of example 1. Thus, the transfer of charges, namely cations, in the glazing of example 1 bis was very incomplete, both in colouration and decolouration.

Thus, the advantages of the invention revealed by the first series of experiments is confirmed. The power supply according to the invention ensures that the glazing maintains its performance characteristics at low temperature, so that the use thereof can be envisaged in building facades without having to provide means for protecting it against the cold or for heating it. Moreover, this power supply makes it possible to a certain extent for the user to choose the switching time.

Thus, the contrast of 5 can be obtained according to the invention at 0° C. both in 6 minutes and in 150 seconds, but obviously the intensities to be generated must be increased with the same proportions.

However, it should be noted that with a switching time shortened to 150 seconds, the "consumptions" remain below 100 mA, i.e. very reasonable.

A third series of experiments was carried out under the same conditions as the second, except with regard to the use temperature which is now 20° C.

Figure 4:
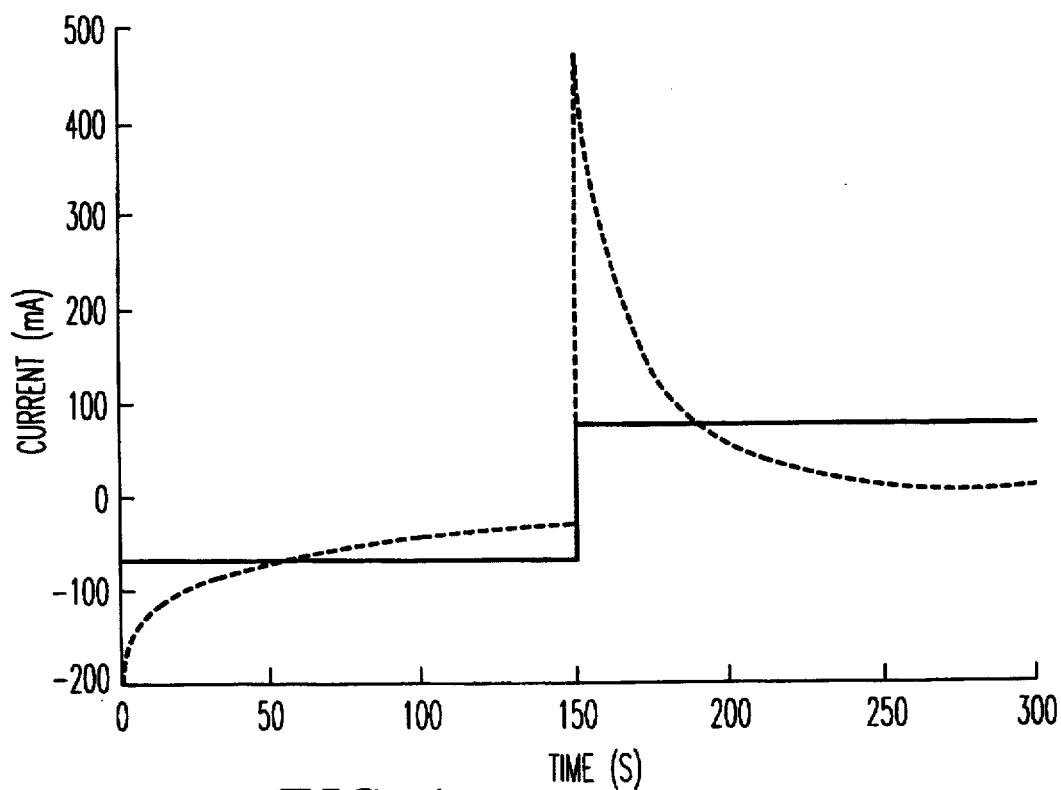
FIGS. 4 and 5 are the same representations, but at 20° C.
Figure 5:
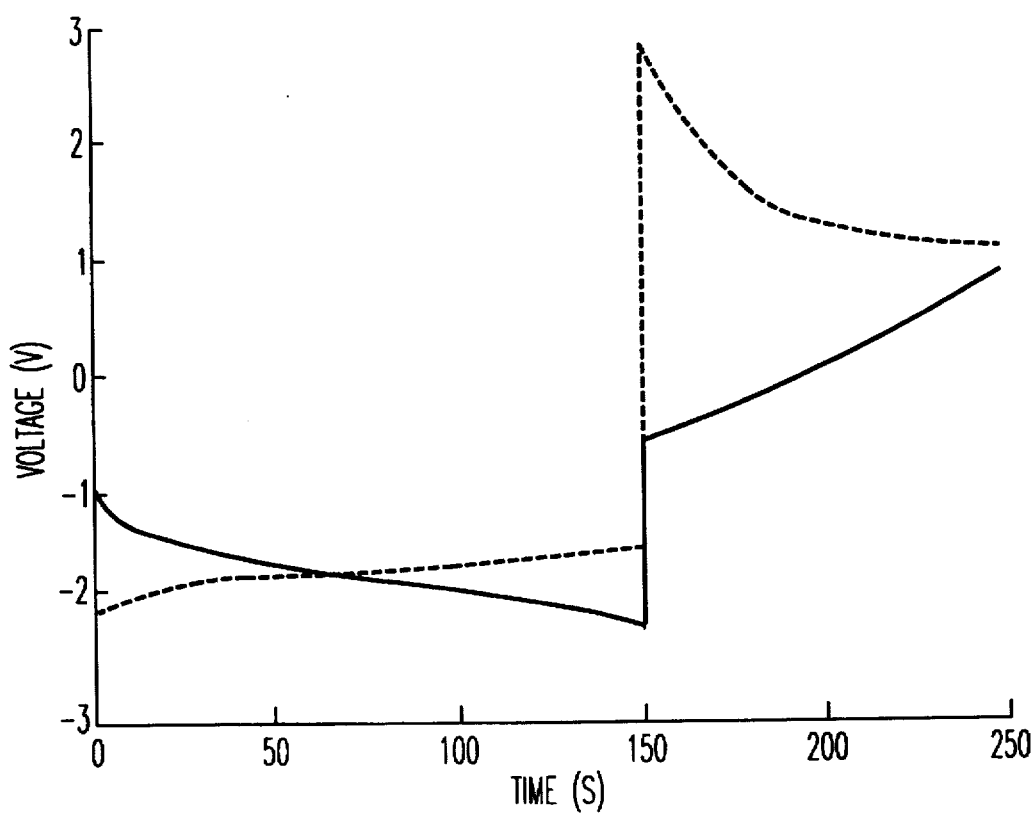

The graphs of FIGS. 4 and 5 respectively describe the intensity and voltage variations of the two glazings as a function of time, in the same way as the graphs of FIGS. 2 and 3. On this occasion, the two glazings are able to achieve contrasts of 5 in 150 seconds. However, these two graphs very clearly show the significant differences between the two supply types. Thus, on referring to FIG. 4, it can be seen that with the connection according to the invention the same intensity of ±66.6 mA as hereinbefore is generated for a temperature of 0° C. The invention makes it possible to no longer have to modify in systematic manner the supply mode of the glazing as a function of its presumed use temperature range.

Still in accordance with the graph of FIG. 4, on studying the intensity curve of example 1 bis given in dotted line form, it can be seen that it has peaks, one at the start of colouration and the other larger peak at the start of decolouration. Thus, at the start of decolouration the intensity has a peak at approximately 480 mA to be compared with the 66.6 mA of the curve of example 1 according to the invention. Such sudden and large intensity variations are linked with the edge effect phenomenon.

On referring now to the graph of FIG. 5, it is also possible to see significant differences between the curves of the two examples.

It should be stressed that in the three series of experiments, the glazing according to the comparative example has a marked edge effect. The change of colouration starts at the periphery and progressively arrives at the central portion of the glazing, there being no homogeneous colouration change over the entire glazing. However, the glazing according to example 1 virtually does not have this phenomenon, which is an important esthetic plus.

The final experiment performed at 20° C. choosing a switching time of 150 seconds subjects the glazing according to example 1 to an intensity supply by the generator 8 controlled by the control unit 10, which also regulates it as a function of the voltage measured by the measuring means 9 in order to guarantee the electrochemical stability of the glazing. On this occasion regulation only takes place in the decolouration phase, which is the most critical, because experimentally this is the phase where there can be sufficiently high voltages to risk generating damaging parasitic reactions.

The decolouration phase regulation is performed in the following way. The intensity applied by the generator is that determined by the unit 10, as hereinbefore, for transferring the desired number of cations in a given time.

Then, throughout the decolouration, the measuring means 9 "informs" the control unit 10 of the voltage at the terminals of the glazing for a given time interval (quasi-continuous). The control unit then calculates for each voltage measurement supplied its second derivative with respect to time. As soon as the latter reaches a reference value, here fixed at 0.5 MV.S−2, the control unit 10 makes it necessary for the intensity generator 8 to reduce by a factor of 2 the intensity value which it supplies. The control unit then completely interrupts the power supply, either when the intensity value reaches a very low reference value close to zero, or when the efficiency has reached a 100% reference value. In this example, the supply is interrupted for an intensity below 0.3 mA, which corresponds to a 99.8% efficiency.

Figure 6:
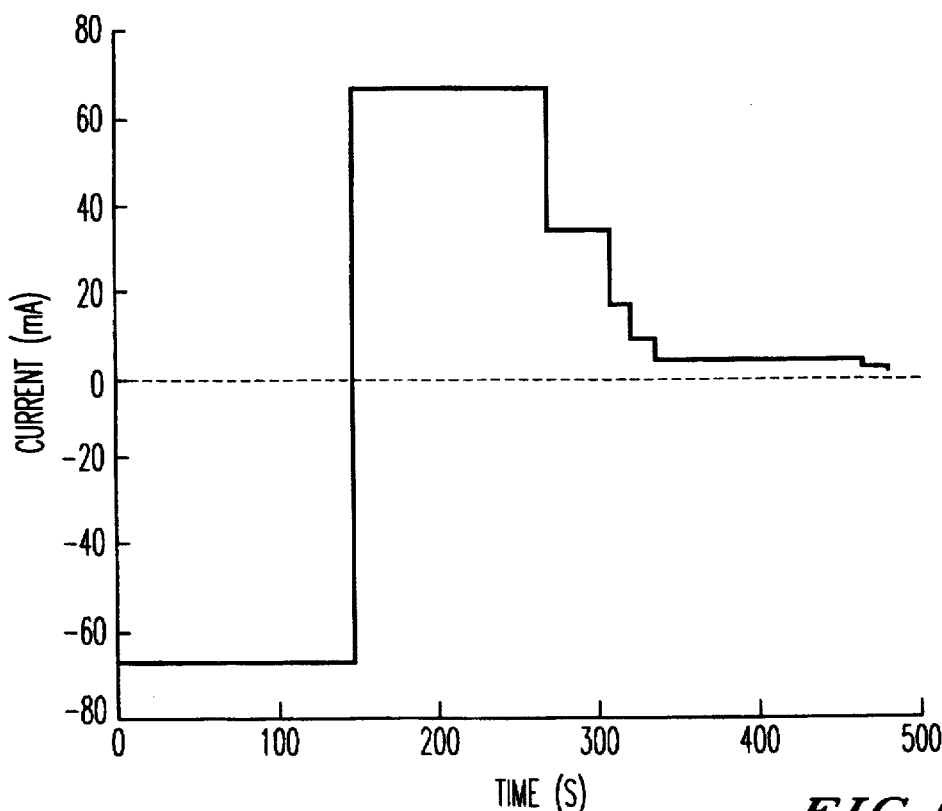
FIGS. 6 and 7 are prepresentations of the evolution of the intensity and voltage at 20° C. during a colouration/decolouration cycle in the case where the intensity is regulated as a function of "sudden" voltage variations.
Figure 7:
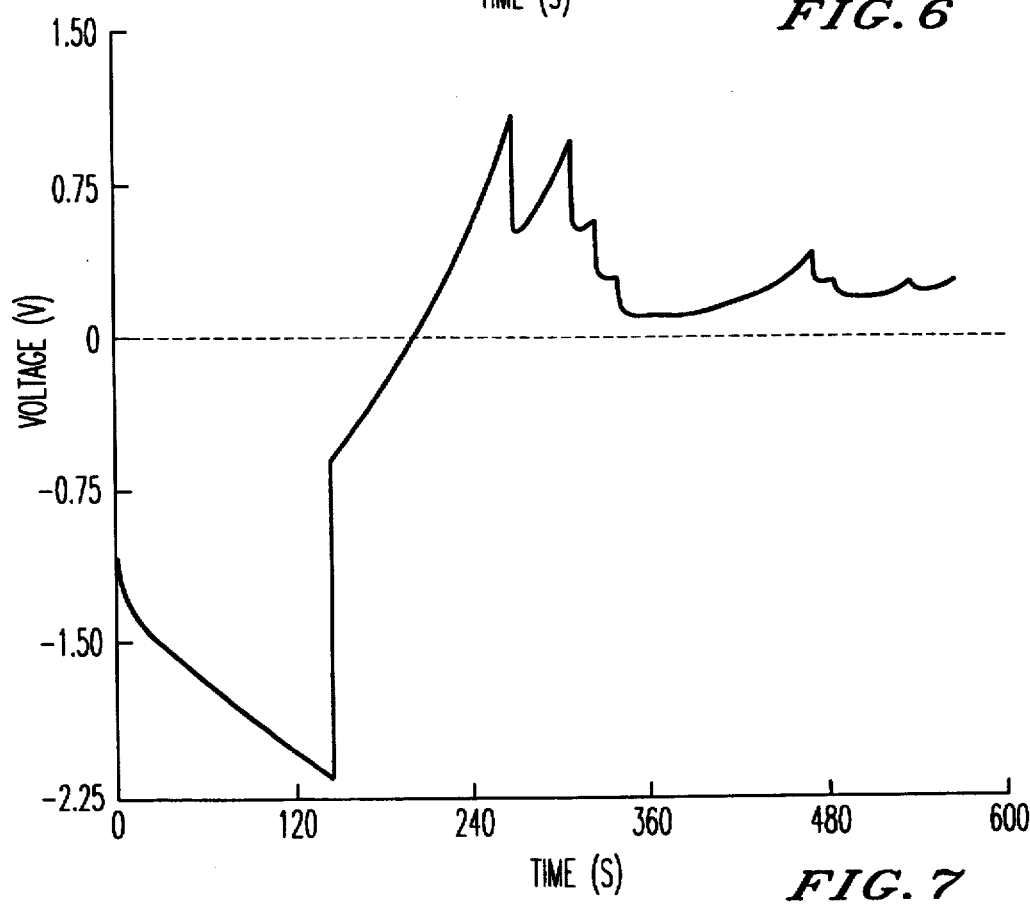

The graph of FIG. 6 shows this regulation by a range-based decrease in the intensity. On the abscissa is the rise in second and on the ordinate the intensity is mA. However, the graph of FIG. 7 represents the time in seconds on the abscissa and the voltage in volts on the ordinate. It is possible to see the successive stages of the regulating operation, which rapidly make the voltage drop as soon as it suddenly rises.

It could be contended that such a regulation appears to lead in to switching times in the decolouration phase slightly exceeding the switching times chosen for the colouration phase. In actual fact the decolouration mainly takes place in the first 150 seconds, in the same way as the colouration, although it only ends somewhat later.

However, the assurance of avoiding in this way any deterioration to the glazings compensates the disadvantage which could occur through the slight increase in the switching time in decolouration. This is in fact only a non-limitative regulating example and other types of regulation can be chosen, should this prove necessary, for optimizing the time factor. A simple method e.g. consists of increasing the value of the intensity imposed in decolouration. It is also possible to regulate the intensity in the colouration phase. Everything is then based on compromises between the safety margins which it is wished to guarantee, the greater or lesser stability of the materials chosen for manufacturing the glazing, the greater or lesser importance of the switching speed, etc.

As indicated hereinbefore, the invention is in no way limited to proton systems. In order to demonstrate this, comparative tests between a potentiostatic supply and an intensiostatic supply according to the invention were performed with a second electrochromic glazing type, which functions by inserting lithium ions.

The characteristics of the materials used for this lithium-based system are as follows:

glass substrate 3: 1.5 mm thick float glass sheets of dimensions 10×15 cm$^2$;

conductive layers 4: tin-doped indium oxide, deposited by magnetron cathodic sputtering, of thickness 400 nanometers and square resistance 8 ohms;

cathodic electrochromic material 5: tungsten oxide $WO_3$ deposited by reactive magnetron cathodic sputtering from a tungsten target in the presence of oxygen under a pressure of 20 millitorrs (i.e. 2.66 Ps) and of thickness 300 nm;

anodic electrochromic material 7: nickel oxide deposited by magnetic field-assisted cathodic sputtering under a pressure of 3.33 Pa of a gaseous mixture of oxygen and hydrogen in a volume ratio of 80:20 and thickness 200 µm, said counterelectrode being electrochemically formed in a solution of propylene carbon—$LiClO_4$, salt in order to preinsert lithium ions therein prior to the assembly of the system;

electrolyte: polyoxyethylene doped with lithium triflate over a thickness of 80 micrometers.

As hereinbefore, a comparison was made between the switching times necessary for obtaining a contrast of 5. With the intensiostatic connection according to the invention an intensity of 2.1 mA was applied.

| Temperature | Potentiostatic connection | Intensiostatic Connection |
|---|---|---|
| 0° C. | 20 min. | 5 min. |
| 20° C. | 5 min. | 5 min. |
| 80° C. | 2 min. | 5 min. |

Once again a very significant reduction in the switching times was noted.

It has been shown that the process according to the invention consists of forcing the passage of an appropriate quantity of charges, said quantity being exclusively dependent of the nature of the electrochromic material layers and the desired degree of colouration change. In particular, this quantity of charges is completely independent of the ion resistance of the electrolyte. Thus, it is possible to supply electrochromic systems with an electrolyte which is a relatively poor ion conductor without increasing the switching times. All that is important is that said conductivity is not in theory zero.

In practice, it is also desirable for the voltage corresponding to the current intensity imposed to remain within reasonable limits, which in particular implies values compatible with safety in the available electrical network type. It is also necessary to take account of the heating of the system due to the Joule effect. Nevertheless, these limits still offer a very considerable degree of freedom in the choices available and the voltages applied can vary e.g. between 1 and 100 V.

If the ion conductivity of the polymer becomes a less critical parameter, new ion conductive polymers may possibly be used, whose ion conductivity is e.g. below $10^{-6}$ Ohm$^{-1}$·cm$^{-1}$ at 20° C., the selection applying more particularly to polymers having better mechanical properties. This also amounts to lowering the minimum temperature of use of the electrochromic system.

Another very interesting way is offered by the possibility of increasing the thickness of the electrolyte, which leads to a double advantage. On the one hand it makes it possible to compensate possible planeity defects of the glazings, which are usually observed with heat-tempered glass glazings and on the other allows a wider spacing of the electroconductive layers, which simplifies the problem of electrical insulation between said layers. This possibility of increasing the electrolyte thickness is more particularly advantageous for "all-solid" systems, which use as the electrolyte a mineral layer and for which there are serious short-circuit problems.

It must also be stressed that this charge quantity is not dependent on transparent electroconductive layers, so that layers with a square resistance exceeding 15 Ohms, e.g. approximately 20 to 25 ohms can be used, whilst retaining adequate switching times, but the edge effect will become more sensitive as the resistivity of the conductive layers increases.

Thus, an electrochromic glazing of 40×80 cm$^2$ was produced, whose electrically conductive layers 4 have a square resistance of 17 Ohms. For a potentiostatic connection with a distance of 80 cm between the current lead strips, in the center there is a contrast of 3 after 10 minutes. For the same glazing and the same colouration duration using an intensiostatic connection according to the invention and the intensity of 66.5 cm, the contrast in the center is 5.

The last but by no means least advantage is that said charge quantity is relatively independent of the aging state of the system and production fluctuations (which remains true when the charge quantity imposed remains equal to or below the insertion capacity of the material). This makes it possible to ensure constant performance levels, in switching speed terms, even in the presence of glazings having different ages (e.g. replacement of one of the windows of a facade).

It should also be noted that the intensiostatic power supply leads to reduced power consumption for a given intensity, the voltage applied being lower in absolute values and consequently the power is lower.

Finally, in the aforementioned example, there is only one electrochromic glazing supplied by one electric circuit. However, it is obvious that the power supply system according to the invention can be applied with advantage to a plurality of electrochromic glazings connected in series or parallel in the same circuit. In the case of a series connection, the voltage measurement then preferably takes place at the terminals of at least one or each of the glazings.

What is claimed as new and is desired to be secured by Letters Patent of the United States is:

1. An electrochromic system comprising:
    a material, whose coloration state or transmission in certain electromagnetic radiation wavelengths varies by performing an electrochemical reaction involving applying an electric current;
    an intensity generator for supplying a variable current, the variable current having an intensity which obeys a reference value determined as a function of a number of charges to be transferred for switching from an initial coloration state to a desired coloration state and as a function of a time chosen for the switching; and
    means for regulating the intensity supplied by the intensity generator, at least when a coloration change is a decoloration, in order to remain at an intensity which is below, in absolute terms, a value corresponding to at least one of a voltage and a voltage variation that gives rise to a deterioration of the system.

2. The electrochromic system according to claim 1, further comprising:
    means for determining the intensity supplied by the intensity generator independent of a use temperature of the system.

3. The electrochromic system according to claim 1, wherein the means for regulating comprises at least one of a data processing means and an electronic means.

4. The electrochromic system according to either claim 1 or 3, wherein the means for regulating further comprises:
    a voltage measuring means;
    means for determining a second derivative with respect to time of said voltage; and
    means for reducing the intensity supplied by the intensity generator when said derivative has reached a reference value.

5. The electrochromic system according to either claim 1 or 3, wherein the means for regulating further comprises:
    a means for measuring the voltage or for calculating a derivative of said voltage with respect to time; and
    means for reducing the intensity supplied by the intensity generator when said voltage or said derivative reaches a reference value using the measurements/calculations of the voltage or the derivative since the coloration change of the system started.

6. The electrochromic system according to claim 1, wherein the means for regulating further comprises:

a means for interrupting the intensity generator when at least one of the intensity supplied, an efficiency and the coloration state of said system reaches a reference value.

7. The electrochromic system according to claim 1, further comprising:

plural connections from plural electroconductive layers to the means for regulating, wherein the plural connections are two supply points on each of said plural conductive layers, each of the supply points supplying a conductive network in contact with respective conductive layers.

8. The electrochromic system according to claim 7, wherein the plural connections to the means for regulating comprises two conductive supply strips deposited on one edge of each of the plural conductive layers which are diametrically opposite.

9. The electrochromic system according to claim 1, further comprising:

two transparent glass sheet substrates;

two transparent, electroconductive layers covering said substrates;

an electrode formed by a layer of an electrochromic material separating the electroconductive layers;

an electrolyte; and a counterelectrode, wherein the intensity generator is connected to the electroconductive layers.

10. The electrochromic system according to claim 9, wherein the electroconductive layers have a square resistance exceeding 15 Ohms.

11. The electrochromic system according to claim 9, wherein the electrolyte at 20° C. has an ion conductivity below $10^{-6}$ $Ohm^{-1} \cdot cm^{-1}$.

12. The electrochromic system according to claim 1, wherein the time chosen for switching is independent of a size of the system and independent of a use temperature.

13. A method for the electrical supply of an electrochromic system, whose switching between two coloration states is obtained by applying a variable electrical current, the method comprising the steps of:

generating a regulated intensity which is a function of the number of charges to be transferred to obtain a coloration change and as a function of a coloration change time, wherein at least when the coloration change is decoloration, the regulated intensity is maintained in absolute terms below an intensity corresponding to at least one of a voltage and a voltage variation that gives rise to a deterioration of the system; and applying the regulated intensity to an electrochromic material.

14. The method according to claim 13, wherein the step of generating generates the regulated intensity independent of a use temperature of the system.

15. The method according to claim 13, wherein the step of generating further comprises:

measuring the voltage in the circuit;

determining at a given time interval, a second derivative with respect to time of the voltage; and reducing the regulated intensity when said second derivative reaches a reference value.

16. The method according to claim 15, wherein the step of reducing the regulated intensity further comprises:

interrupting the regulated intensity when at least one of a) the regulated intensity reaches a minimum reference value, b) the efficiency is 100% and c) the coloration state of the system has reached a reference value.

17. The method according to claim 13, wherein:

the step of generating further comprises measuring the voltage or calculating, using the measurement of the voltage, a first derivative with respect to time of the voltage, at a given time interval; and reducing the regulated intensity when said voltage or said first derivative reaches a reference value based on the measurements/calculations of the voltage or the first derivative since the coloration change started.

* * * * *